UNITED STATES PATENT OFFICE.

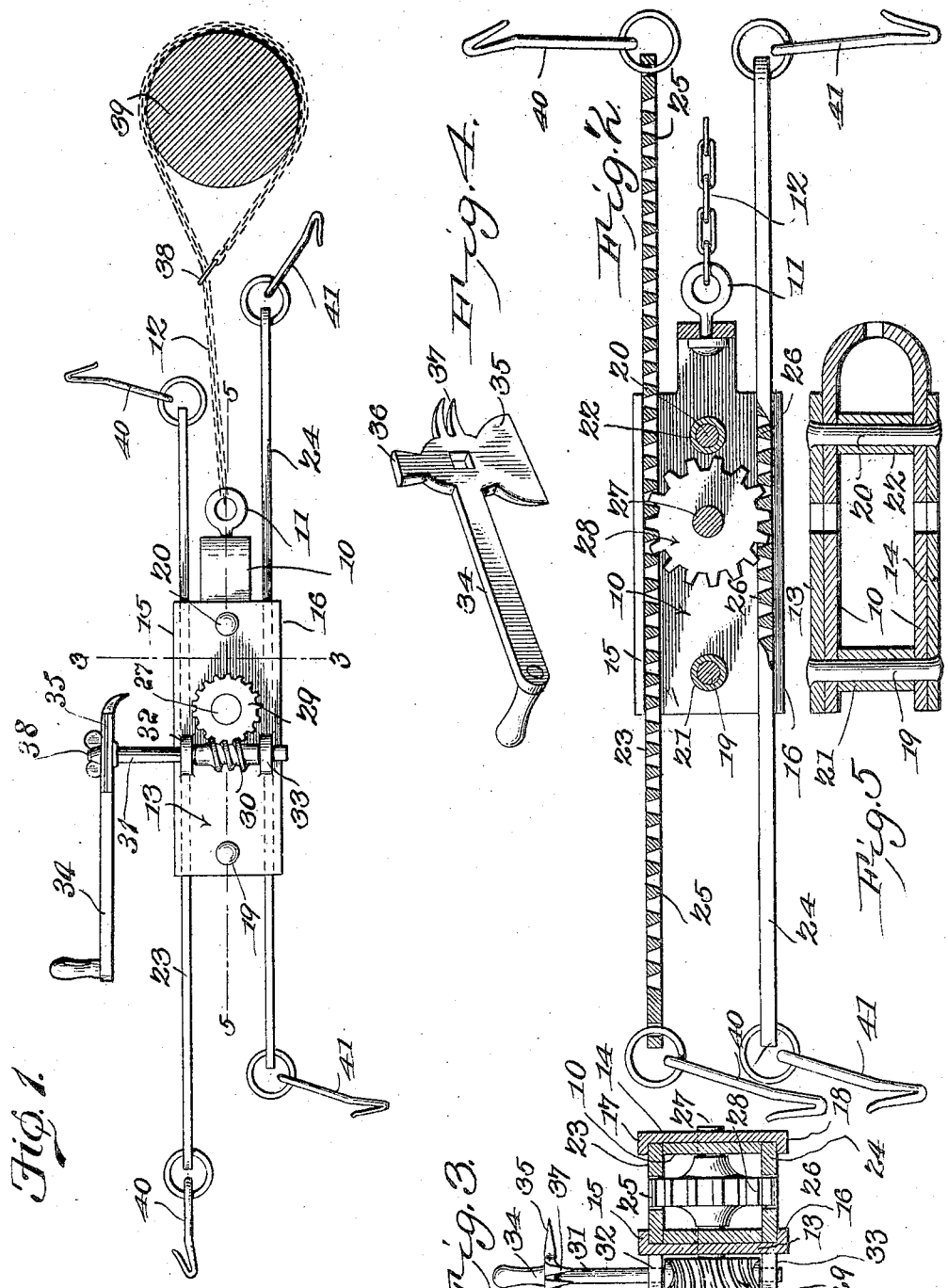

FELIX L. FEIST, OF BARCLAY, TEXAS.

WIRE-STRETCHER.

No. 817,907. Specification of Letters Patent. Patented April 17, 1906.

Application filed November 7, 1905. Serial No. 286,236.

*To all whom it may concern:*

Be it known that I, FELIX L. FEIST, a citizen of the United States, residing at Barclay, in the county of Falls and State of Texas, have invented a new and useful Wire-Stretcher, of which the following is a specification.

This invention relates to devices for stretching wires, more particularly for use in building and repairing wire fences, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings thus employed, Figure 1 is a plan view of the improved device applied. Fig. 2 is a longitudinal sectional elevation of the same. Fig. 3 is a transverse section, enlarged, on the line 3 3 of Fig. 1. Fig. 4 is a detached perspective view of the combined handle and staple driving and pulling implement. Fig. 5 is a transverse section, enlarged, on the line 5 5 of Fig. 1.

The improved device comprises a U-shaped frame 10, provided at the bend or closed end with a swivel 11, to which a flexible member, such as a chain 12, is attached. Bearing upon the outer faces of the frame 10 are plates 13 14, having flanges 15 16 17 18 extending over the edges of the sides of the frame 10 and spaced therefrom and forming guiding-channels along the sides of the frame. The plates 13 14 and frame 10 are coupled by transverse tie-bolts 19 20 and spacer members 21 22, the tie members preferably riveted in the plates, as shown in Fig. 5. By this means a very strong and durable frame is produced which may be inexpensively constructed from sheet metal and pressed into the required shape.

Slidably disposed in the guide-channels are bars 23 24, having gear-teeth 25 26 centrally of the same from end to end, the bars thus forming "rack-bars," as shown.

Journaled through the frame 10 and plates 13 14 is a shaft 27, carrying a gear-wheel 28, operating in the teeth of the rack-bars, as shown in Fig. 2. Upon one end of the shaft 27 a worm-gear 29 is connected, and engaging this worm-gear is a worm-pinion 30 upon a transverse shaft 31, journaled in bearings 32 33, extending from the plate 13. Detachably mounted upon the shaft 31 is an operating-handle 34, preferably with a head portion in the form of a hatchet 35, hammer-head 36, and claw 37, and held in position as by a wing-nut 38, the handle member serving when detached as a convenient implement for driving staples, drawing staples, or cutting stakes and the like. The chain member 12 is provided with a terminal hook 38 to enable the same to be attached to a post, as at 39, and the opposite ends of the bars 23 24 are provided with wire-engaging means, such as hooks 40 41.

With a device thus constructed when a wire is to be stretched toward a post, the crank or handle 34 will be rotated to move the bars 23 24 within their guide-channels until the hooks 40 41 are at the farthest point from the frame 10. The chain 12 is then connected to a post, as at 39, and the hook 40 coupled to the wire to be stretched far enough from the end to enable the terminal to reach to and beyond the post when the stretching action is completed. The handle member 34 is then operated in the opposite direction, with the effect of causing the gear 28 to withdraw the bars 23 24 and stretch the wire toward the post. When the broken ends of a wire are to be drawn together, the bars 23 24 are distended, as above described, and the hooks 40 41 coupled to the respective ends of the wire and the stretching operation repeated until the ends are overlapped sufficiently to be coupled or a link or section of wire connected between the broken ends in the ordinary manner.

It will be obvious that a very powerful strain may be applied to the bars 23 24 by the employment of the worm-pinion and worm-gear mechanism.

Having thus described the invention, what is claimed is—

1. In a device of the class described, a frame of spaced side members having oppositely-disposed guide-channels and connected at one end, a flexible member coupled to said connecting means and adapted for attachment to a stationary support, rack-bars slidable in said channels, a shaft journaled in said side members and carrying a gear-wheel engaging said rack-bars, clamping means at the ends of said rack-bars, and means for rotating said shaft.

2. In a device of the class described, a frame formed of spaced side members having oppositely-disposed guide-channels, and connected at one end, a flexible member coupled to said connecting means and adapted for attachment to a stationary support.

3. In a device of the class described, a U-shaped frame, a flexible member connected to the closed end of the frame, plates attached to the outer faces of the side portions of said frame and with flanges at the edges extending over the edges of said side members and spaced therefrom to form longitudinal guide-channels between the frame and plates, rack-bars slidable in said channels a shaft journaled transversely of said frame, a gear-wheel carried by said shaft and engaging said rack-bars, clamping devices upon the ends of said rack-bars, and means for rotating said shaft.

In testimony that I claim the foregoing as my own I have hereto affixed my signature in the presence of two witnesses.

FELIX L. FEIST.

Witnesses:
 CARL YETTER,
 AUGUST HOELSCHER.